United States Patent
Mansouri Rad et al.

(10) Patent No.: US 9,967,052 B2
(45) Date of Patent: May 8, 2018

(54) PHOTONIC LAYER AWARE PATH COMPUTATION ELEMENT

(71) Applicants: Mohammad Mehdi Mansouri Rad, Kanata (CA); Hamid Mehrvar, Ottawa (CA)

(72) Inventors: Mohammad Mehdi Mansouri Rad, Kanata (CA); Hamid Mehrvar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/248,890

(22) Filed: Aug. 26, 2016

(65) Prior Publication Data

US 2018/0062783 A1 Mar. 1, 2018

(51) Int. Cl.
*H04J 14/02* (2006.01)
*H04B 10/272* (2013.01)

(52) U.S. Cl.
CPC ........ *H04J 14/0227* (2013.01); *H04J 14/021* (2013.01); *H04B 10/272* (2013.01)

(58) Field of Classification Search
CPC ...... H04B 10/03; H04J 14/0201; H04J 14/021
See application file for complete search history.

(56) References Cited

U.S. PATENT DOCUMENTS

| 2008/0013566 A1* | 1/2008 | Smith | .................. | H04W 74/04 370/447 |
| 2010/0220996 A1* | 9/2010 | Lee | ..................... | H04J 14/0227 398/25 |
| 2014/0341572 A1* | 11/2014 | Sambo | ................ | H04J 14/0257 398/48 |
| 2015/0312658 A1* | 10/2015 | Winzer | .............. | H04Q 11/0005 398/5 |
| 2015/0319078 A1 | 11/2015 | Lee et al. | | |
| 2017/0085316 A1* | 3/2017 | Al Sayeed | .......... | H04J 14/0201 |

FOREIGN PATENT DOCUMENTS

| CN | 102420757 A | 4/2012 |
| CN | 102752185 A | 10/2012 |
| CN | 105827322 A | 8/2016 |

OTHER PUBLICATIONS

Chiu A et al., "Architectures and Protocols for Capacity Efficient, Highly Dynamic and Highly Resilient Core Networks [Invited]", J. Opt. Comm Net, Jan. 2012.
International Search Report dated Apr. 19, 2017 for corresponding International Application No. PCT/CN2016/105111 filed Nov. 8, 2016.

* cited by examiner

*Primary Examiner* — Dzung Tran

(57) ABSTRACT

A network controller in a control plane and a method for selecting a connection for a wavelength channel from a plurality of connection candidates in a communications network. The network controller comprises a modeling module and a routing engine. The modeling module obtains information from a physical element in the network, related to an estimated time for the element to establish each connection candidate therethrough for the wavelength channel. The routing engine selects the connection taking into account the estimated time associated with each connection candidate.

29 Claims, 7 Drawing Sheets

PHOTONIC LAYER AWARE PATH COMPUTATION ELEMENT

CROSS REFERENCE TO RELATED APPLICATIONS

Not Applicable.

TECHNICAL FIELD

The present disclosure relates to communications networks and in particular to an apparatus and method for routing a communication flow through a communications network.

BACKGROUND

Modern long-haul ("backbone") and/or metropolitan ("metro") communications networks often include one or more reconfigurable optical add-drop multiplexers (ROADMs) at geographically separated locations such as cities or distribution points within a city. By definition, a ROADM is an optical network element that routes (that is, adds or passes) optical signals directly and avoids Optical-Electrical-Optical (OEO) conversion. Integration of ROADMs into the present WDM networks provides a pay-as-you-grow capability and flexibility to provision wavelengths dynamically. This allows the ROADM to both pass through any separate wavelength between WDM node line interfaces and to add/drop any separate wavelength from WDM line interfaces to add/drop ports.

Pairs of such ROADMs are coupled by a section, which may comprise one or more optical fibers. In some examples, where the physical distance between ROADMs is long, the section may consist of a plurality of optical fiber spans, coupled in series by optical amplifiers, such as erbium doped fiber amplifiers (EDFA) and/or Raman amplifiers.

Each ROADM may be coupled to a plurality of optical and/or electro-optical communication links by which data can be added to or offloaded from the backbone network. Such links may in turn be coupled to local network nodes such as transponders, routers and/or communications devices such as computers.

The network may support thereon a plurality of wavelength channels or optical signals. Such wavelength channels may be routed through the network along a path comprising a sequence of sections coupled by ROADMs between a source and a destination node. The sequence of sections and ROADMs is known as a path. In this context, a connection for a wavelength channel refers to the path established for the wavelength channel from source to destination, together with the spectrum or wavelength assigned or allocated to the wavelength channel for each section.

It will be appreciated that "connection" is used in this fashion in the telecommunications industry and the use of such term in this description should not be taken to imply the existence of any direct physical connectivity between the source and the destination. Indeed, a "connection" will typically involve a sequence of coupled nodes and sections as discussed above.

In some examples, a section may comprise a plurality of spans of fiber coupled by amplifiers.

In some examples, adjacent fiber spans or sections in a connection for wavelength channel may have the same or different spectrum allocation. Where a connection has a common spectrum allocation throughout, the connection is said to be transparent. Where, however, the spectrum allocation is not the same throughout the connection, the connection is said to be translucent.

In some examples, a section may employ wavelength division multiplexing (WDM) to support a plurality of wavelength channels. A WDM system may differ on channel spacing and different wavelength patterns. A coarse WDM (CWDM) channel has wide spacing and fewer channels on silica fiber while a dense WDM (DWDM), following ITU recommendations, has 100 GHz or 50 GHz spacing with 40 and 80 channels across the C-band, respectively. Under ultra dense WDM, channel spacing of 12.5 GHz is possible. Furthermore, under WDM architecture there is no substantive difference between fixed-grid networks with regular wavelength spacing, such as, without limitation, 50 GHz and/or 100 GHz, and flex-grid networks with wavelength spacing that may be larger or smaller, and in some examples may be in multiples of 6.25 GHz and/or 12.5 GHz. Accordingly, in this context a wavelength channel may comprise a WDM channel, a CWDM channel, a DWDM channel, a fixed-grid channel and/or a flex-grid channel.

Typically, establishing a connection for a wavelength channel involves two substantially independent actions by different hierarchical network planes or layers.

The first action is typically performed by a path computation element (PCE) server in the control plane and involves selecting a connection for a wavelength channel from among a plurality of connection candidates. In some examples, a service layer in an application plane provides a request to the PCE server for a connection to be computed between a source node and a destination node.

Routing refers to the identification, by the PCE server using a routing algorithm, of a connection between the source and destination node for a wavelength channel.

In some examples, the PCE server is implemented as a dedicated server, and/or a PCE function as part of a server, such as a central provisioning Network Management System (NMS) server and/or distributed across a plurality of routers. In software-defined networking (SDN) systems and/or Transport SDN (T-SDN) systems, the PCE function can form part of a T-SDN controller and/or network orchestration layer and works with a PCE request and response Protocol (PCEP). The PCE server is typically presented with a request to select a connection by the service layer.

In some examples, the PCE is constrained, in terms of selecting a connection, by business considerations, including constraints imposed by any applicable service level agreements (SLA) as well as factors such as network utilization, resource efficiency, quality of service (QoS) and latency considerations.

The selection of a connection subject to such constraints typically involves routing and spectrum assignment (RSA), or, in case of fixed-spaced wavelength channels, routing and wavelength assignment (RWA). RSA is conventionally used in the context of flex-grid WDM while RWA is conventionally used in the context of fixed-grid WDM. In this disclosure, the terms RWA and RSA are used interchangeably. RSA is a subset of the PCE server and/or function that deals specifically with the photonic and/or optical layer.

In some examples, RSA may be implemented within the PCE server. RSA techniques have tended to focus on either or both of maximizing service quality (in terms of signal to noise ratio (SNR), optical SNR (OSNR) and/or Q-factor) and increasing resource utilization and/or efficiency. Examples of approaches to improve service quality include using different cost functions and/or optimization criteria, such as considering latency, number of hops and/or load balancing.

Examples of techniques to improve resource efficiency include RSA scheme such as, without limitation, fixed routing, alternative routing, shortest-path (SP), k shortest-path (k-SP) and/or A-star routing techniques.

In some examples, the selection of a connection may incur a delay on the order of several milliseconds to hundreds of milliseconds, depending upon the complexity and/or sophistication of the RSA technique employed and the available computational and storage capacity to implement the technique. Other factors also affect the overall timing for the PCE server to compute the desired connection such as, without limitation, the network size, complexity of the physical layer models and/or required accuracy.

More recently, the selection of a connection has taken into account physical layer impairment (PLI) effects on performance metrics. In this context, PLI refers to the static impairments experienced by a wavelength channel for a corresponding selection candidate. PLI can take into account post-transient effects when a traffic channel is established and the network has converged and optimized. Such PLI effects can include both linear effects and non-linear effects (e.g. optical Kerr effects) and the complex interaction between linear and non-linear effects. Linear PLI effects can include, for example, amplified spontaneous emission (ASE) of an amplifier, loss and dispersion. Non-linear PLI effects include without limitation, cross-phase modulation, self-phase modulation and four-wave mixing.

Proposals to address PLI effects have, in some examples, involved using physical layer modeling to provide estimates of PLI effects into the PCE server. Such estimates provide the RSA engine with improved information about the offered signal quality for each wavelength channel associated with a connection candidate. The estimation of PLI effects permits customized figures of merit (FOMs) such as SNR, OSNR and/or Q-factor to be defined and evaluated by the RSA engine.

In some examples, the generation of PLI effect estimates may also take on the order of several milliseconds, depending upon the accuracy and sophistication of the PLI effect estimate employed and the available computational and storage capacity to implement the estimate as well as the network size.

The second action is typically performed by a lower photonics management layer and involves the set-up of a path for a wavelength channel associated with the selected connection. In such action, provisioning information is sent to all corresponding elements involved in the establishment of the traffic, including without limitation, ROADMs and amplifiers if appropriate, to build the optical topology for the selected connection. In some examples, network provisioning can take on the order of several milliseconds, considering issues of delay latency and available computational and storage capacity at the various network elements.

Once the connection has been selected by the control plane and provisioned, the corresponding elements are subjected to physical adjustments. By way of non-limiting examples, transponders are tuned to recommended wavelengths, add/drop banks at the source and destination nodes are adjusted to pave the path for the wavelength channel set-up along the selected course, ROADMs are adjusted to open pipes, power levels are adjusted using variable optical attenuators (VOA) and the amplifiers between the ROADMs are commanded to handle a power variation. Once the physical adjustments have been made, the photonic layer effects the turn-up of the wavelength channel associated with the selected connection.

Unlike RSA, PLI and network provisioning, each of which can involve timing on the order of milliseconds, the actions to make the physical adjustments and then turn up the wavelength channel associated with the selected connection, may in some examples, take on the order of several seconds, that is, about 3 orders of magnitude longer.

In conventional backbone networks, the disparity in timing between the action of selecting a connection and the action of setting up the connection is largely irrelevant because the connection tends to be set up a priori and have very long durations. Accordingly, the actions have remained separate and effectively sequential.

In next-generation networks, it is increasingly likely that a connection will be selected and set-up on an as-needed ad hoc basis, being characterized by rapid turn-up and tear-down and short duration of the connection and its associated wavelength channel.

Methods and systems that reduce the overall set-up time of a connection through a network would be desirable.

SUMMARY

The present disclosure discloses a T-SDN architecture in which its PCE server efficiently takes into account the complexity of operations by photonic layer management, as well as the dynamic behaviour of network elements, to provide faster configurable services.

Because conventional RSA schemes do not include photonic layer management actions into account in their overall optimization, the average time for establishing a connection is dominated primarily by the slow operations at the photonic layer to turn up the wavelength channel associated with the selected course. In the present disclosure, instead of selecting a connection based on, by way of example, the best possible Q-factor, a connection can be selected that can be established quickly, for instance, with minimal photonic layer actions to turn up its associated wavelength channel.

Such architecture makes use of information, at the PCE server, of the dynamic behaviour of the photonic layer and of photonic layer actions taken by the management layers. The disclosed architecture supports a method of cross-layer optimization that permits the PCE server to select a connection by taking into account photonic layer timing issues in the turn-up of the connection's associated wavelength channel. The PCE server utilizes a cost function that takes into account metrics related to the total establishment time for connection requests for the wavelength channel associated with the selected connection. In such a cost function, pre- and post-transient effects during wavelength channel establishment are taken into account so as to minimize photonic layer action.

The method thus permits the PCE server to weigh an estimate of the time to turn-up the wavelength channel associated with each connection candidate, in conjunction with other constraints, to identify a suitable connection prior to turn-up. Thus, it is more likely that connection candidates with shorter turn-up times will be identified with a corresponding reduction in the connection time for the selected connection.

According to an example of the present disclosure, there is disclosed a method of selecting a connection for a wavelength channel from a plurality of connection candidates in a communications network. The method comprises actions at a PCE server in a control plane of obtaining information from a physical element in the network, related to an estimated time for the element to establish each connection candidate there through for the wavelength channel and selecting the connection taking into account the estimated time associated with each connection candidate.

The action of obtaining can be performed by a network controller for performing a PCE function, a domain controller associated with the element and/or the element.

The action of obtaining can include determining the estimated time from the information. The action of determining can be performed by a network controller, a domain controller associated with the element and/or the element.

The action of selecting can take into account at least one of an SLA constraint, network utilization, resource efficiency, QoS, transmission delay, bit error rate (BER), PLI effects, a cost function, a latency, a number of hops, load balancing and an optimization criterion.

The action of selecting can perform RSA. The action of performing RSA can comprise fixed routing, alternative routing, shortest-path (SP), k shortest-path (k-SP) and/or A-star routing, can take into account SNR, OSNR and/or Q-factor and can comply with a PCEP.

The action of selecting can obtain a PLI effect estimate. The PLI effect estimate can be generated by a network controller for performing a PCE function, an\ domain controller associated with the element and/or the element.

The method can further comprise an action of establishing the selected connection using the physical element associated with the selected connection. The action of establishing can comprise network provisioning and/or performing physical adjustments to the element to turn-up the wavelength channel associated with the selected connection.

According to an example of the present disclosure, there is disclosed a network controller in a control plane of a communications network for selecting a connection for a wavelength channel from a plurality of connection candidates. The controller comprises a modeling module and a routing engine. The modeling module is for obtaining information from a physical element in the network for determining an estimated time for the element to establish each connection candidate therethrough for the wavelength channel. The routing engine is for selecting the connection taking into account the estimated time associated with each candidate.

The network controller can be a PCE server, a central provisioning NMS server, at least one of a plurality of distributed routers, a T-SDN controller and/or a network orchestration layer and/or can comprise a PCE function on a server.

The wavelength channel can be a WDM channel, a CWDM channel, a DWDM channel, a fixed-grid channel and/or a flex-grid channel.

By way of a non-limiting example, the physical element can be a ROADM, a VOA, an optical amplifier, a WSS, a fiber and/or a transponder. The information can relate to a ROADM, a VOA coupled to the ROADM, an optical amplifier coupled to the ROADM, a WSS coupled to the ROADM, a fiber coupled to the ROADM and/or a transponder coupled to the ROADM.

The information be an estimated turn-up time, an adjustment time, a resting time, a stabilization time, a provisioning time, a tuning time, a messaging time, a control and/or handling time, a latency, an offset associated with the wavelength channel associated with the connection candidate, a margin divided by the offset, a customized function, an ability to open the connection candidate in parallel and/or a FOM.

The information can incorporate photonic layer processing comprising provisioning, messaging and delays for establishing a topology, adjustments to the physical element, performance-related issues, communications between elements and/or dynamic behaviour of the element.

The modeling module can determine the estimated time. The modeling module can be coupled to the physical element, which may be through a domain controller. The domain controller can obtain the information from the physical element and determine the estimated time and/or forward it to the modeling module.

The routing engine can perform RSA.

The network controller can comprise a PLI evaluator for providing an estimate to the routing engine for the connection candidates.

According to an example of the present disclosure, there is disclosed a PCE server in a control plane, having a processing unit and a non-transitory memory containing computer-readable program instructions for selecting a connection for a wavelength channel from a plurality of connection candidates in a communications network. When executed by the processing unit the instructions cause the server to perform actions of obtaining information from a physical element in the network, related to an estimated time for the element to establish each connection candidate there through for the wavelength channel, and selecting the connection taking into account the estimated time for establishing each connection candidate.

BRIEF DESCRIPTION OF THE DRAWINGS

Examples of the present disclosure will now be described by reference to the following figures, in which identical reference numerals in different figures indicate identical elements and in which.

DESCRIPTION

Figure 1:
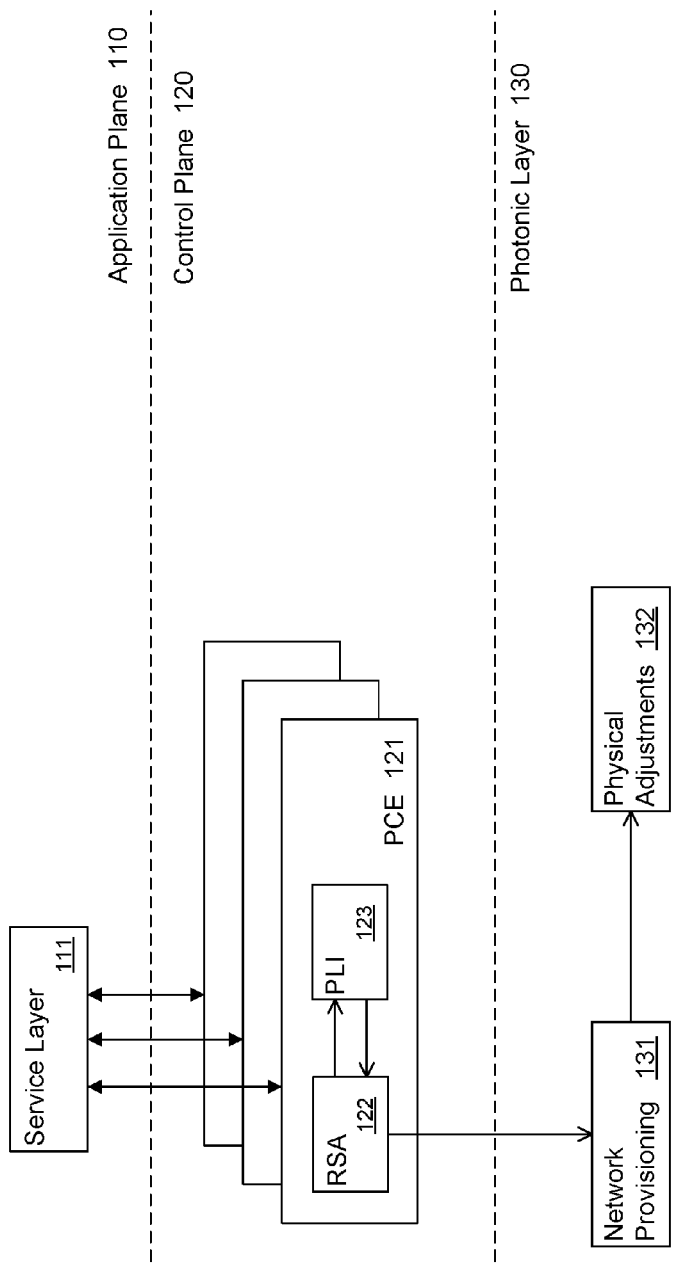
FIG. 1 is a block diagram of an NMS showing example interactions between system elements in selecting a connection through a network according to an example of the present disclosure.

FIG. 1 illustrates example interactions between system elements of the application plane 110, control plane 120 and the photonic layer 130 in selecting a connection.

The application plane 110 comprises a service layer 111 that communicates with one or more PCE servers 121 in the control plane 120 to identify a desired source and destination node and any constraints such as, without limitation, a corresponding client port, demanded rate and/or latency to the PCE server 121 and to accept or reject a corresponding connection selected by the PCE server 121.

The control plane 120 comprises (among other management functions, including without limitation, orchestration) one or more PCE servers 121 that comprise an RSA engine 122 and a PLI evaluator 123.

The RSA engine 122 identifies potential connection candidates and identifies each connection candidate to the PLI evaluator 123. The RSA engine 122 then receives PLI effects estimates from the PLI evaluator 123 and selects one of the connection candidates that comply with service performance constraints, including without limitation, OSNR.

The RSA engine 122 identifies the selected connection to the photonic layer 130. In some examples, the RSA engine 122 employs an in-band and/or out-of-band control channel to carry control information to the photonic layer 130. In some examples, the RSA engine 122 may employ an RSA scheme including those described above.

The PLI evaluator 123 evaluates the static PLI effects corresponding to wavelength channel associated with each connection candidate identified by the RSA engine 122 and returns PLI effects estimates to the RSA engine 122 for each candidate. In some examples, the PLI evaluator 123 generates customized FOMs, including without limitation, OSNR. In some examples, the PLI evaluator 123 employs centralized estimates in which the PLI effects estimates is generated by the PLI evaluator 123. In some examples, the PLI evaluator 123 employs decentralized estimates in which the PLI effects estimate is generated by domain controller 229a-229e (FIG. 2) associated with an affected element and/or by the element itself and provided to the PLI evaluator 123. In some examples, the PLI evaluator 123 employs hybrid estimates.

The photonic layer 130 receives the selected connection from the RSA engine 122 and establishes the physical connectivity at the photonic layer 130 for the selected connection. The photonic layer 130 comprises, among other functions, management functions such as network provisioning functions 131 and physical adjustment functions 132.

Network provisioning 131 involves creating a topology for the selected connection including sending commands to nodes (including without limitation ROADMs and/or amplifiers) and all network elements involved in the establishment of the wavelength channel associated with the connection. In some examples, the commands are sent along an in-band or out-of-band control channel. The exact mechanism by which such commands are conveyed may depend upon the particular manner of implementation of the photonic layer.

Turn-up and tear-down refer to processes of adding and dropping a wavelength channel in such a manner that the traffic of existing wavelength channels in the same span or section is not impacted by such addition or deletion. Such processes include the physical adjustments 132, such as actions to establish the physical links, including wavelength channels associated with the selected connection, to give effect to the topology for the selected connection. Such actions may include, without limitation, tuning transponders, opening ROADMs, adjusting VOAs, gains, and/or tilts and/or performing photonic layer optimization before and/or after network provisioning 131. Such adjustments take into account any dynamic or transient effects due to active elements and may involve time delays in order to minimize the likelihood of and/or to compensate for and manage undesired perturbations in the other wavelength channels as a result of overall power changes due to the addition and/or deletion of a wavelength channel. In some examples, the actions are sent along an in-band or out-of-band control channel. The exact mechanism by which such commands are conveyed may depend upon the particular manner of implementation of the photonic layer.

The perturbations may arise in both the fiber(s) and any amplifiers within the section. By way of example, stimulated Raman scattering (SRS) effects in optical fibers can lead to power redistribution among wavelength channels when new wavelength channels are added and/or dropped in the section.

Optical amplifiers may also be subject to perturbations due to time- and load-dependent optical amplification processes. Optical gain ripples and/or tilts tend to skew and distort optical power distribution of the wavelength channels. Furthermore, the presence of non-linear effects such as spectral hole burning (SHB) introduces even further complications.

Typically, EDFAs within a section in terrestrial backbone networks are configured in gain mode, in which a control loop at the EDFA is designed to guarantee a provisioned gain $G_p$. Further, for reasons of cost, speed, complexity, and/or transparency, such amplifiers are usually designed to maintain an average gain across all wavelength channels, as opposed to a per-channel gain. The control loop may be configured to adjust EDFA pumping so as to keep an overall average measured gain $G_m$ at a constant value (targeted with $G_p$). In some examples, the control loop is adjusted to pump a total input power $P^{Tot}_{in}$ and tilt so as to minimize the error $|G_m - G_p|$, where $G_m$ may be determined by tapping $p^{Tot}_{in}$ and the total output power $P^{Tot}_{out}$:

$$G_m = P^{Tot}_{out} - P^{Tot}_{in} \qquad (1)$$

More complex control circuits and control methods as well as more sophisticated amplifier architectures may also be used. In some examples, several multiple-stage optical pumps at different wavelengths and optical power levels may be provided for pumping the amplifier. Other architectures may employ schemes for this purpose, including by way of non-limiting example, all-optical clamping, feed-forward and feedback. In some examples, there may be feedback and/or feed-forward controls at different wavelengths.

Changes in the input spectrum fed into the amplifier, e.g. by turn-up and/or turn-down of a wavelength channel, will indirectly affect per-channel gain experienced by the pre-existing wavelength channels. However, the control loop may not be provided with information about the static and dynamic effects that this has on individual wavelength channels. The gain change experienced by a pre-existing wavelength channel due to spectral changes is referred to as "offset" or channel power excursion. In some examples, the offset may be in the range of less than 0.5 dB per amplifier. The offset may be experienced as an overshoot or undershoot, which in most cases, degrades performance of the existing wavelength channels.

Where the length of a section is large, there may be a number of amplifiers interconnecting fiber spans within the section. In such configurations, the small per-amplifier offset may accumulate and the section may experience severe offsets, which may approach 10 dB, due to capacity changes. This may result in long adjustment times because there are more actions to be performed by the photonic layer to perform adjustments to compensate for such offsets on a per-channel basis.

Due to the nonlinearity of perturbation effects, especially SHB, offset due to channel turn-up and/or turn-down has a complex nature. Turn-up algorithms, including without limitation, bundling algorithms, attempt to iteratively effect turn-up so as to limit the spectral perturbation in each iteration, thus limiting the amount of offset experienced by any existing wavelength channel carrying traffic. Such algorithms tend to incorporate a large number of engineering rules designed to minimize any side effects due to the non-linear behaviour of EDFAs or Raman amplifiers.

The number of amplifiers and the length of spans separating amplifiers within a section tend to be design decisions, balancing a time for a transmitter to recover a signal along a fiber (optical path latency $L_i$) against a time $T_{EDFA}$ that is allocated for the amplifier to rest during turn-up. In some examples, $T_{EDFA}$ may be on the order of 200-300 µs per iteration. Reducing $T_{EDFA}$ substantially below such threshold may cause the network to experience significant transients.

In addition to the foregoing, ROADMs may comprise a plurality of wavelength selective switches (WSS). When a wavelength channel is added or dropped at a ROADM, the turn-up algorithms provide a time $T_{ROADM}$ that is allocated for each WSS in the ROADM to gradually adjust optical loss for specific channels and converge to and/or stabilize at its provisioned target gain or other characteristic. In some examples, the time $T_{WSS}$ for a WSS to open (reduce VOA loss to a defined value to permit light output through) is on the order of less than 500 ms and the value chosen for $T_{ROADM}$ tends to be a design option that takes this into account.

As a result, implementing wavelength channel turn-up and/or tear-down at the photonic layer tends to be approached conservatively and capacity change actions tend to be performed in series, section by section. As a result, once a connection comprising a new wavelength channel has been selected, the turn-up/tear-down process for each section in the connection may incur a significant amount of time. The time for channel turn-up and/or tear-down may thus be scaled by the number of sections in the selected connection. With the foregoing in mind, an example time $T_{TU}$ for turning-up a wavelength channel in a section may be:

$$T_{tot} = S*T_{TU} = S*\Sigma c^{-1} L_i + m(T^i_{ROADM} + nT^i_{EDFA} + T^i_0) \quad (2)$$

where: S is the number of sections for a connection from a source to a destination;
the summation is from i=1 to a maximum number of iterations depending upon the traffic loading in each section, which may depend upon a bundling strategy employed;
c is the speed of light in an optical fiber link;
$L_i$ is length of $i^{th}$ optical fiber link;
m is a number of iterations to add the wavelength channel (s), which may be less than the number of wavelength channels due to channel grouping; and
$T_0$ represents an additional time related to communication messaging through an optical service channel (OSC) and for the WSS and amplifiers to converge to and/or stabilize at a provisioned target gain or other characteristic. Such time may be spent ensuring that collected data is not reliable and not stale.

In some examples, $T_0$ tends to comprise a significant portion of the timing bottleneck, typically in the order of seconds. Thus, even though the selection of a connection may be performed quickly (on the order of milliseconds), the set-up of the selected connection, including turn-up of its associated wavelength channel(s) may take several orders of magnitude longer (on the order of minutes or tens of seconds), because of the iterative photonic layer adjustments to minimize the effect of perturbations on existing wavelength channels in each section as described above.

Future T-SDN architectures are expected to address dynamic bandwidth demands in an environment to support applications such as typical wavelength channel traffic and evolving applications, such Optical Burst Switching (OBS), restoration/protection, temporary elephant flow and path-hopping. Such an environment is characterized by fast and very fast connection set-ups with medium to small hold times without compromising reliability.

In A. Chiu et al. "Architectures and Protocols for Capacity Efficient", J. Opt. Comm. Net 2012 at Table, it is shown that such environments call for RSA execution set-up times on the order of tens of milliseconds, as opposed to set-up times on the order of tens of minutes as is conventionally experienced.

Figure 2:
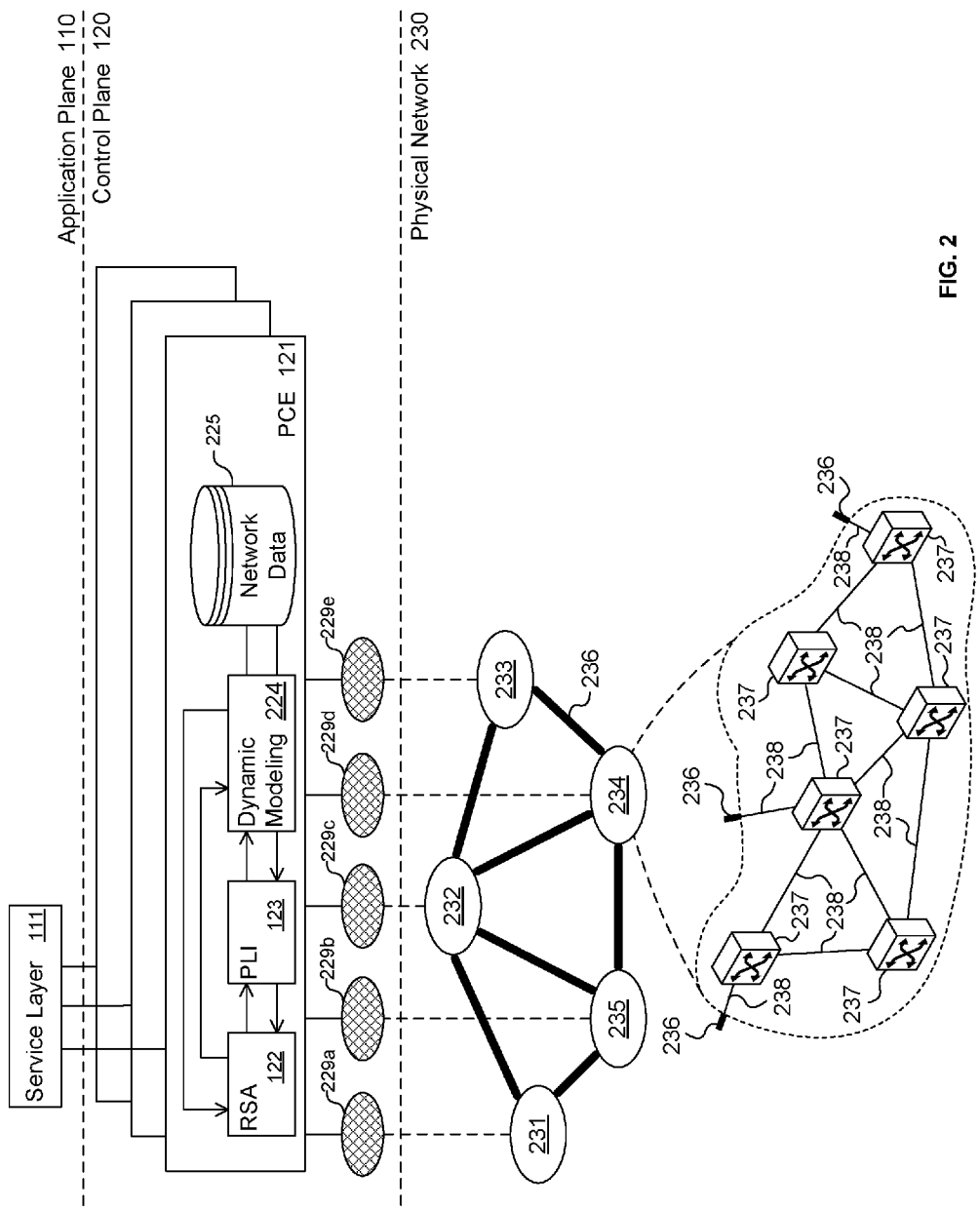
FIG. 2 is a block diagram of an NMS of a physical network for selecting a connection through the network using a photonic layer-aware approach according to an example of the present disclosure.

FIG. 2 illustrates example interactions between the application plane 110, control plane 120 and a physical network 230 in an example T-SDN architecture configured to permit a PCE server 121 to be aware of and efficiently take into account the complexity of operations by photonic layer management, as well as the dynamic behaviour of network elements (including without limitation optical amplifiers) to provide faster configurable services.

In this figure, the control plane 120 comprises one or more domain controllers 229a-229e. Further, the PCE server 121 also comprises a dynamic modeling module 224 and a network data repository 225.

The dynamic modeling module 224 obtains and/or generates estimates of timing for photonic layer operations for elements in the physical network 230 corresponding to the wavelength channel associated with each connection candidate identified by the RSA engine 122 and returns such estimates to the RSA engine 122 for each connection candidate that may be incorporated into the connection selection made by the RSA engine 122.

Because the control plane 120 has time estimates of photonic layer operations, it can select a connection whose associated wavelength channel can be established with minimal photonic layer actions. Thus, the PCE 121 may be said to be aware of the timing of the photonic layer actions associated with the wavelength channel associated with each connection candidate.

Such estimates are obtained from information provided by the domain controllers 229a-229e corresponding to the element(s) that may be involved in routing a wavelength channel along each connection candidate and/or from the element itself. Such information may include, without limitation, equations and/or models by which the time is estimated.

In some examples, the element may be and/or the information may relate to a ROADM 237 and/or a VOA, optical amplifier, WSS, fiber 238 and/or transponder coupled thereto in a section between the ROADM 237 and another ROADM 237.

In some examples, the information may be an estimate of the turn-up time $T_{Tot}$ for a wavelength channel associated with a connection candidate, a provisioning time for the topology, an optical path latency $L_i$ of an optical fiber span, an adjustment time for the ROADM, a resting time for the amplifier $T_{EDFA}$, a stabilization time for the section, a provisioning time in the network element, an adjustment time for a VOA, EDFA and/or WSS ($T_{WSS}$) setting in a ROADM ($T_{ROADM}$), a time to tune from an existing to a new wavelength, a messaging time from a head-end ROADM to a tail-end RODM through a communication channel, a control and/or handling time ($T_O$) and/or a FOM for the section.

In some examples, the estimates are generated by the dynamic modeling module 224 in a centralized approach from information on such element(s) maintained in the network data repository 225. In some examples, such information is obtained by the domain controller 229a-229e coupled to (or otherwise associated with) such element(s) from the element(s) and forwarded to the dynamic modeling module 224. In some examples, such information is maintained in the network date repository 225.

In a centralized approach, the dynamic modeling module 224 obtains all the monitoring and inventory information available to the PCE 121 in the control plane 120 and generates estimates for each wavelength channel associated with each connection candidate provided by the RSA engine 122.

The centralized approach relies on the computational and storage capacity in the dynamic modeling module 224 in the control plane 120 and takes advantage of a network level visibility of the wavelength channel associated with the connection candidates on an end-to-end basis. Furthermore, the centralized approach takes advantage of the network data repository 225 that contains recent and/or updated dynamic performance metrics. Additionally, under a centralized approach, the dynamic modeling module 224 can further evaluate a wavelength channel associated with a connection candidate by querying metrics of certain desired and mandatory characteristics. Still further, the centralized approach benefits from the ability to update and correct models and predictions over time by taking into account historical performance and by correlating data from disparate sources.

In some examples, the estimates are calculated locally in the physical network 230 and provided to the dynamic modeling module 224 in a distributed approach. In some examples, such estimates are obtained by the dynamic modeling module 224 from the domain controller 229a-229e coupled to such elements. In some examples, such estimates are derived by the domain controller 229a-229e. In some examples, such estimates are derived by the element itself. In some examples, such estimates are maintained in the network data repository 225.

In a distributed approach, a local agent associated with each element in the physical network 230 generates the estimate and provides it to the PCE server 121. In some examples, the local agent resides on a ROADM 237 (and/or an amplifier if no ROADM 237 is available). The generation of the estimate and/or the upload of the estimate to the PCE server 121 may be performed on a periodic basis or upon request from the dynamic modeling module 224. For example, a local agent associated with a given element in the physical network 230 may only be requested to generate and/or upload the estimate when and if a connection candidate is identified having associated with a wavelength channel that makes use of such element.

The distributed approach benefits from the fact that the estimates are generated at a location that is physically closer to where the dynamic effects being monitored are occurring. This may provide certain computational, reliability and responsiveness advantages.

In some examples, a hybrid approach combining aspects of the centralized and the distributed approach is employed.

Whichever approach is employed, the estimates and underlying information being generated and/or processed by the dynamic modeling module 224 describes dynamic photonic layer behaviour. The estimates and/or underlying information may incorporate, without limitation, any one or more of the following photonic layer processing:

Provisioning and related messaging to all involved elements to establish the specified topology; and/or Delays for provisioning commands to reach the corresponding nodes, for each node to process and/or execute such commands and for the commands to take effect;

Adjustments to elements such as:
    VOAs, EDFAs (including without limitation, gains, tilt and/or power), and ROADMs 237 (including without limitation, WSS settings (such as port selection and/or opening WSS VOA(s) for desired wavelength channel(s)); and/or
    time for the ROADM 237 to adjust the WSS loss profile to a desired optimized value and/or time for the ROADM 237 to have its profile converge and stabilize);

Performance-related issues for transponders including without limitation:
    timing and/or risks in tuning the transponder from an existing wavelength to a new wavelength identified by the PCE 121;
    changing the transponder output/input power;
    adjusting digital signal processor (DSP) electronics to new impairment compensation (polarization mode dispersion (PMD), chromatic dispersion (CD) and/or polarization dependent loss (PDL)) parameter sets for the selected wavelength channel and path;
    Proper selection or adjustment to the constellation of the analogue signals to be carried through the channel
    Modulation formats such as phase shift keying (PSK, DPSK), dual-polarization PSK, etc as well as the baud rate, bandwidth, modulation index, etc.

Inter-ROADM 237 communications including without limitation:
    management messaging, control messages and/or handling to guarantee overall network performance and/or reliability; handling upstream actions/messages/control signals; and/or
    updating downstream ROADMs 237 with information from upstream ROADMs 237 during channel turn-up; and/or
    optimally adjusting the gain profile of amplifier sites); and/or Dynamic behaviour of EDFA and/or Raman amplifiers (including without limitation, ripple, SHB, tilt, stimulated Raman scattering, and/or convergence time) that are usually compensated for through actions at the photonic layer during turn-up.

In some examples, such as multi-vendor and/or multi-domain scenarios, some of the foregoing data may not be available, in which case, such information may not be included in the estimate and/or underlying data. For example, if the operator running the PCE 121 does not own a given transponder, transponder data may be excluded from the underlying data, if for no other reason than that the data may change because of a decision of the owner of the transponder, which would put at risk the timing estimates provided to the RSA engine 122.

The network data repository 225 obtains and maintains estimates and/or the underlying information regarding the topology, configuration and/or operation of the physical network 230. It provides this information to the dynamic modeling module 224. The network data repository 225 obtains information about the physical network 230 from the various domain controllers 229a-229e through the dynamic modeling module 224.

Each domain controller 229a-229e is interfaced to one or more physical elements of the physical network 230, such as a service provider domain 231-235. In some examples, a domain controller 229a-229e may be a domain optical controller (DOC) that controls a domain. Each domain controller 229a-229e provides information about its associated element to the network data repository 225 through the dynamic modeling module 224.

The physical network 230 comprises a plurality of domains 231-235 coupled by one or more optical links 236 that extend between one domain 231-235 and a second domain 231-235. In the example of FIG. 2, five domains are shown.

Each domain 231-235 comprises a plurality of elements such as ROADMs 237, which in turn may be comprised of and/or be coupled to one or more amplifiers, transponders, fiber infrastructures and other components by fiber sections 238. By way of non-limiting example, domain 234 is broken out to show that it comprises a plurality of ROADMs 237 coupled by fiber sections 238. Additionally, it is shown that the optical links 236 coupled to domain 234 are coupled by fiber sections 238 to various ROADMs 237.

Each of the domains 231-235 is interfaced to a respective associated domain controller 229a-229e from which information regarding the dynamic performance of the components thereof is provided to the dynamic modeling module 224 to be maintained in the network data repository 225 in the control plane 120 for access by the dynamic modeling module 224 and employed in generating timing estimates.

Figure 3:
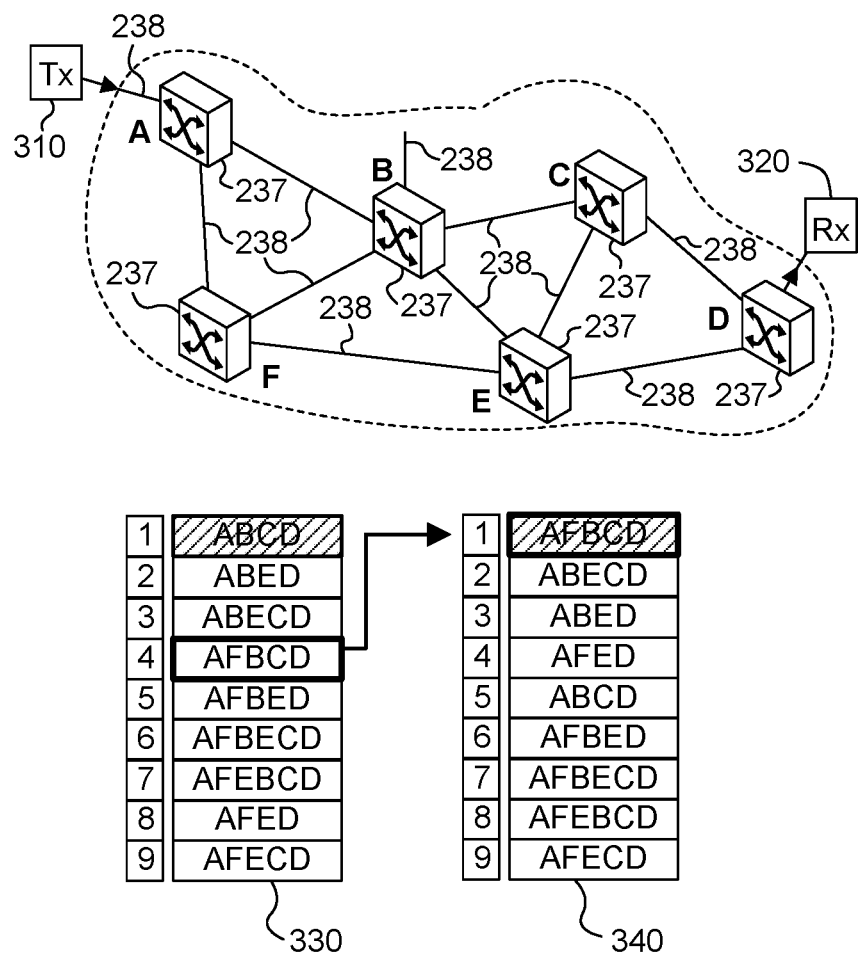
FIG. 3 is a block diagram showing different results for selecting a connection when using and not using the photonic layer-aware approach of FIG. 2.

FIG. 3 illustrates an example of such dynamic-aware PCE connection and wavelength selection. In the scenario presented, a connection extending from a transponder acting as a source transmitter 310 and a transponder acting as a destination receiver 320 is desired by the service layer 111. The source 310 and the destination 320 are presented to the PCE server 120. The RSA engine 122 identifies all available options for connection candidates, noting that the source transmitter 310 is coupled to ROADM A 237 and the destination receiver 320 is coupled to ROADM D 237.

The RSA engine 122 communicates all of the connection candidates to the PLI evaluator 123 and to the dynamic modeling module 224. In some examples, the PLI effects estimates prepared by the PLI evaluator 123 help further reduce the number of available connection candidates to those that satisfy photonic layer performance metrics such as OSNR or Q-factor. This will ensure that the selected connection will not experience impairments that threaten acceptable level(s) of the operational point (including without limitation, data rate, bandwidth, constellations, forward error correction (FEC) and/or dispersion limits) for the corresponding transponders.

In FIG. 3, the total number of viable connection candidates has been reduced to 9 as shown in table 330. The remaining candidates are ordered in terms of descending offered photonic layer performance metrics. In scenarios such as shown in FIG. 1, the top option on table 330, ABCD would be selected as the top connection candidate as it offers the best OSNR, for instance, for the final established wavelength channel after turn-up, i.e., static performance prediction by the PLI evaluator 123.

However, the dynamic-aware PCE server 121 shown in FIG. 2 also has the dynamic modelling module 124, which can further be used to evaluate the dynamics related to each remaining connection candidate during turn-up as well as the amount of work performed by the photonic management layer during and after establishing a wavelength channel. In particular, an estimate of the total turn-up time, corresponding to each remaining connection candidate in table 330, can be derived. It will be appreciated that there are numerous metrics and/or cost functions reflecting various approaches and strategies and in light of various design constraints that can be employed to model and estimate the dynamics involved in service turn-up. One such metric is discussed in detail in the example scenario of FIG. 4 below.

Table 340 shows the remaining connection candidates re-ordered according to one such metric, namely an estimated overall time for the wavelength channel to be established, that is, the overall turn-up time per candidate. Here, the best remaining connection candidate is AFBCD and connection candidate ABCD is ranked fifth.

It will be appreciated that the connection selected by the PCE 121 may take into account a variety of performance metrics, including without limitation, one or more business considerations such as SLA constraints, network utilization, resource efficiency, QoS (associated with different networking layers) and/or transmission delay considerations, bit error rate (BER), PLI effects, cost functions, latency, number of hops, load balancing and/or other optimization criteria in addition to the estimates of photonic layer timing. In some examples, the recommendation may not be based on only one of such factors but may represent a trade-off between photonic layer timing and one or more of such other performance metrics. It will be appreciated that the photonic layer-aware capability can be incorporated with most if not all currently known schemes for RSA calculation, often with little or no incurred additional hardware cost.

Even if the primary or sole criterion is photonic layer timing, there are various estimates or metrics that may be employed. By way of non-limiting example, the metric may be a Margin to Offset (M2O) metric based on choosing the highest ratio of OSNR to the amount of end-to-end offset created by the wavelength channel associated with each connection candidate. Another parameter representing a margin by which an offered photonic layer quality exceeds a minimum acceptable value may be used instead of, or in addition to, OSNR. In some examples, employing such a metric may be beneficial as it may identify wavelength channel(s) associated with connection candidates in which per-section actions, which are typically performed in sequence, can be performed in parallel. Such approaches may provide a further gain in performance by using the photonic layer-aware PCE connection selection described above.

This is because when a wavelength channel is turned up for multiple sections, the time it takes is usually multiplied by the number of sections involved, which is usually one less than the number of nodes traversed. In other words, it has been conventionally assumed (that is, without the benefit of the photonic layer-aware approach disclosed in FIG. 2) that the number of sections traversed by a connection candidate can act as a rough proxy for the estimated turn-up time for such connection candidate.

Using an M2O metric, however, the PCE server 121 can identify the number of existing wavelength channels containing traffic in each section and determine, for example, by comparison against a threshold, whether the expected perturbation by introducing a further wavelength channel is such that it can be opened in parallel with the other section.

In some examples, if the threshold is met, all VOAs and amplifiers are set to the expected target value before or synchronously with the tuning of the transponder. Accordingly, in such a scenario, once the transponder associated with the transmitter 310 has been tuned to accommodate the newly introduced wavelength, its signal propagates all the way to the transponder associated with the receiver 320 and the photonic layer either skips or postpones photonic-layer turn-up actions to a later point when an overall optimization of the network is performed.

Figure 4:
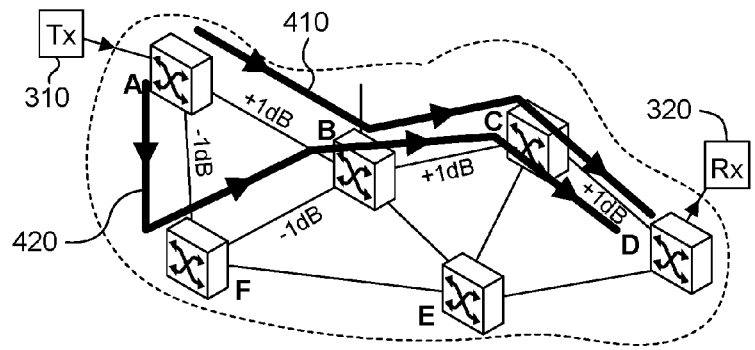
FIG. 4 is a block diagram showing an example scenario in which the photonic layer-aware approach of FIG. 2 may reduce a time for selecting a connection for a wavelength channel.
Figure 4:
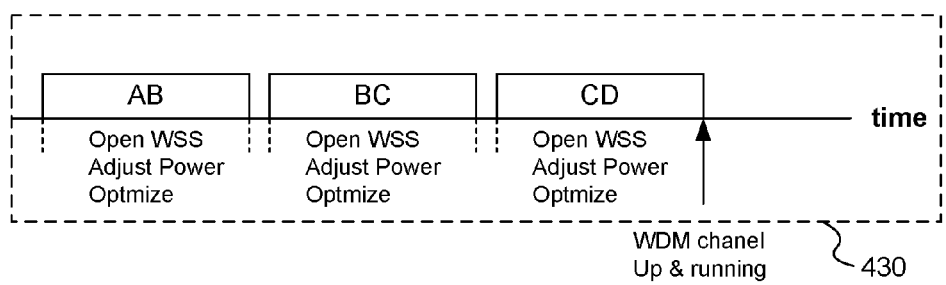
Figure 4:
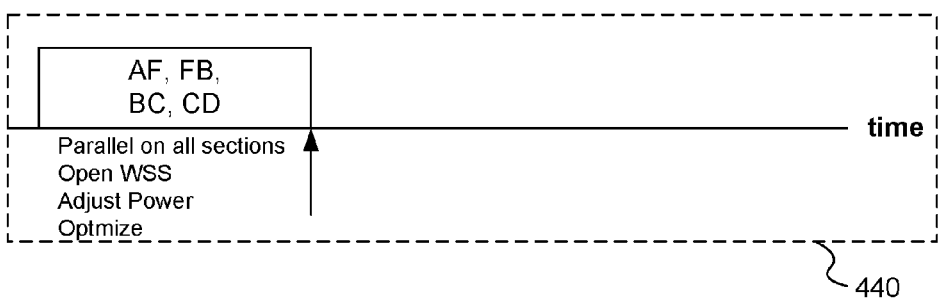

FIG. 4 illustrates this concept in an example scenario in which individual section offsets are shown. In the depicted scenario, the two connection candidates discussed in connection with FIG. 3 are shown, namely connection candidate ABCD 410 and connection candidate AFBCD 420. The offsets for each of the sections involved in one or the other of the connection candidates 410, 420 are shown.

Thus, in FIG. 4, connection candidate ABCD410 (three sections) may be considered conventionally to have a turn-up time approximately three-quarters of the turn-up time for connection candidate AFBCD420 (four sections). It will be appreciated that in such conventional FOM, many details have been omitted, including without limitation, transponder turn-up time and/or number of amplifiers.

However, in the scenario presented, each of the individual sections AB, BC and CD of connection candidate ABCD 410 has an offset of +1 dB. Assuming that a permissible margin is 1 dB, because the overall offset of connection candidate ABCD410 meets or exceeds 1 dB, the connection candidate ABCD 410 will be turned-up in sequential order by section. This is shown in fragment 430.

On the other hand, even though connection AFBCD 420 has one more section than connection ABCD 410, because of the negative offsets of −1 dB in each of sections AF and FB, the overall offset of connection candidate AFBCD 420 does not exceed 1 dB and indeed is 0. Accordingly, in turning-up connection candidate AFBCD 420, the sections AF, FB, BC and CD can be turned-up in parallel, resulting in a turn-up time that is approximately one third of the turn-up time for connection candidate ABCD 410. This is shown in fragment 440.

Figure 5:
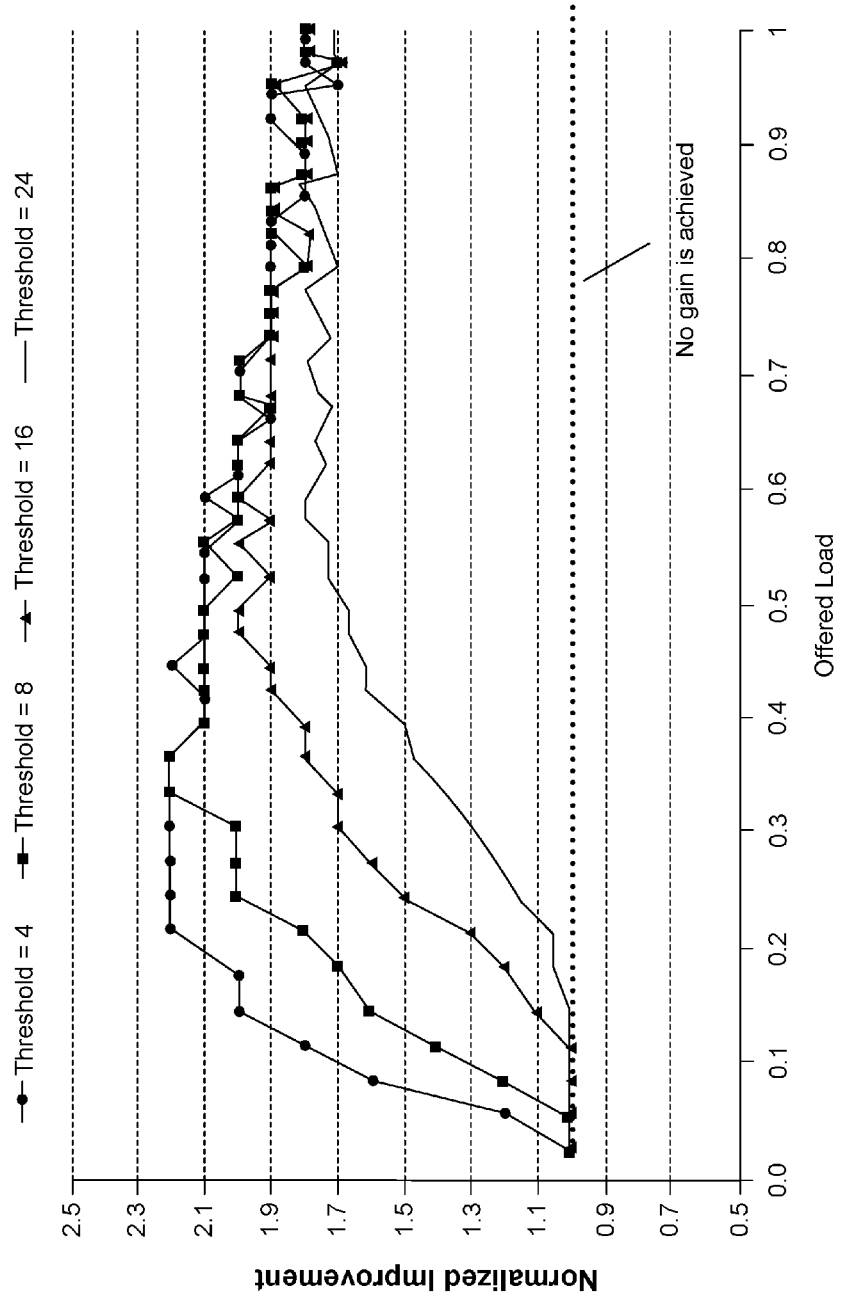
FIG. 5 is an example graph of normalized improvement as a function of offered load for the photonic layer-aware approach of FIG. 2.

FIG. 5 shows an example graph of normalized improvement as a function of the offered load for various threshold values using the photonic layer-aware approach of FIG. 2.

In this context, load is a metric that reflects how the network is utilized. For example, an offered load of 0.5 means that the network uses 50% of the available capacity. Normalized improvement is determined by dividing the time to establish the connection without the photonic layer-aware PCE server 121 of FIG. 2 by the time to establish the connection using the photonic layer-aware PCE server 121. Threshold refers to the number of wavelength channels desired in a section for which the photonic layer-aware PCE server 121 of FIG. 2 can conclude that the resulting offset is negligible or acceptable, thus leading to a fast turn-up without employing any further management actions during turn-up such as, without limitation, amplifier gain adjustments.

Thus is may be seen that the overall turn-up time can be improved by a factor approaching 2 under most network loading scenarios.

The difference in timing gain for different threshold values reflects the principle that the higher the number of existing wavelength channels containing traffic within a section, the lower the perturbation that will be created by introducing a further wavelength channel with traffic.

Example Device

Having described in detail example embodiments that are in accordance with the present disclosure, it is noted that the embodiments reside primarily in combinations of apparatus or devices and processing actions related to interactions between one or more of such components.

Figure 6:
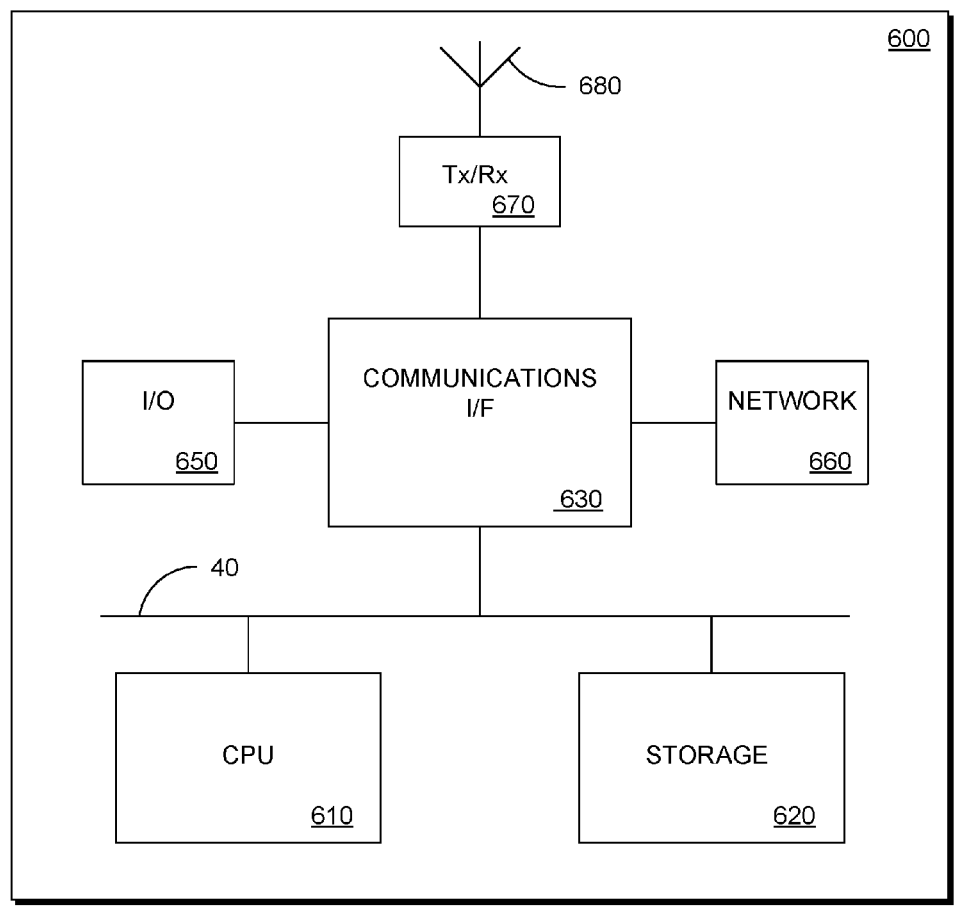
FIG. 6 is a schematic view of a processing system according to an example of the present disclosure.

FIG. 6 is a block diagram of a processing system that may be used for implementing one or more devices, shown generally at 600, such as the PCE server 121 for performing actions in one or more of the methods disclosed herein.

The device 600 comprises a processing unit 610, a storage medium 620 and a communications interface 630. In some examples, the device 600 may also comprise a processing bus 640 interconnecting some or all of these components, as well as other devices and/or controllers. In some examples, the device 600 may comprise an input/output (I/O) device 650, a network connectivity device 660, a transceiver 670 and/or an antenna 680.

The processing unit 610 controls the general operation of the device 600, for example, by sending data and/or control signals to the communications interface 630, and by retrieving data and/or instructions from the storage medium 620 to execute method actions disclosed herein.

However configured, the hardware of the processing unit 610 is configured so as to be capable of operating with sufficient software, processing power, memory resources and network throughput capability to handle any workload placed upon it.

The storage medium 620 provides storage of data used by the device 600, as described above.

The storage medium 620 may also be configured to store computer codes and/or code sequences, instructions, configuration information, data and/or scripts in a computer program residing on or in a computer program product that, when executed by the processing unit 610, causes the processing unit 610 to perform one or more functions associated with the device 600, as disclosed herein.

The communications interface 630 facilitates communication with the I/O device(s) 650, network connectivity device(s) 660 and/or other entities in a communications network. In some examples, the communications interface 630 is for connection to a transceiver 670, which may comprise one or more transmitters and/or receivers, and at least one antenna 680, through which such communications are effected. As such, the communications interface 630 may comprise one or more interfaces and a suitable number of ports, to couple internal and external I/O devices 950, network connectivity devices 660 and the like to the processing unit 610.

Network connectivity devices 660 may enable the processing unit 610 to communicate with the Internet or one or more intranets (not shown) to communicate with remote devices for data processing and/or communications. The network connectivity devices 660 may also comprise and/or interface with one or more transceivers 670 for wirelessly or otherwise transmitting and receiving signals. With such a network connection, it is contemplated that the processing unit 610 may receive information from the network or might output information to the network in the course of performing one or more of the above-described method actions.

The transceiver 670 operates to prepare data to be transmitted and/or to convert received data for processing by the processing unit 610.

Other components, as well as related functionality of the device 600, may have been omitted in order not to obscure the concepts presented herein.

Example Method

Figure 7:
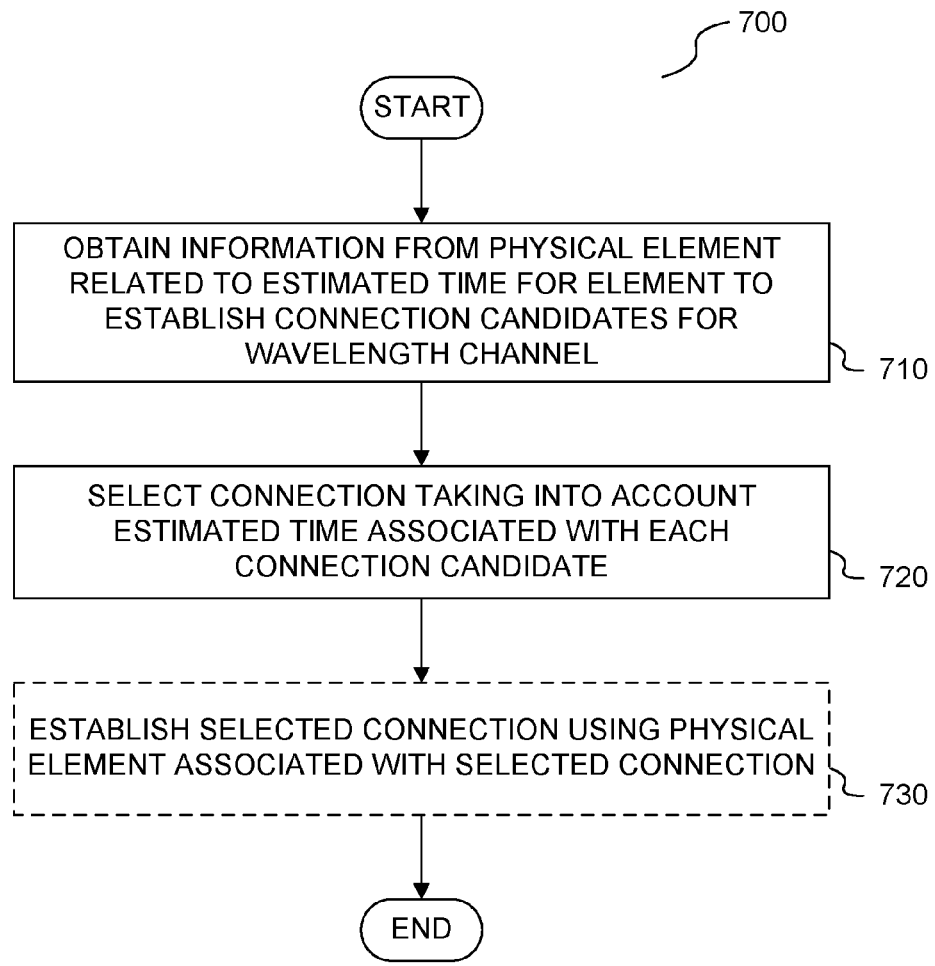
FIG. 7 is a flow chart showing example method actions that may be taken by a PCE server according to an example of the present disclosure.

Turning now to FIG. 7, there is shown a flow chart, shown generally at 700, showing example actions taken by a processor in the PCE server 121 for selecting a connection for a wavelength channel from a plurality of connection candidates in a communications network.

One example action 710 is to obtain information from a physical element in the network, related to an estimated time for the element to establish each connection candidate therethrough for the wavelength channel.

One example action 720 is to select the connection taking into account the estimated time associated with each wavelength candidate.

One example action 730 may be to establish the selected connection using the physical elements associated with the selected connection.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether optically, electrically, mechanically, chemically, or otherwise.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the concepts disclosed herein, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims.

What is claimed is:

1. A method of selecting a connection for a wavelength channel from a plurality of connection candidates in a communications network, comprising actions, at a path computation element (PCE) server in a control plane, of:
   obtaining information from a physical element in the network, related to an estimated time for the physical element to establish each connection candidate therethrough for the wavelength channel; and
   selecting the connection taking into account the estimated time associated with each connection candidate.

2. A method of establishing a connection according to claim 1, wherein the action of obtaining is performed by at least one of a network controller for performing a PCE function, a domain controller associated with the physical element and the physical element.

3. A method of establishing a connection according to claim 1, wherein the action of obtaining comprises determining the estimated time from the information.

4. A method of establishing a connection according to claim 1, wherein the action of determining is performed by at least one of a network controller for performing a PCE function, a domain controller associated with the physical element and the physical element.

5. A method of establishing a connection according to claim 1, wherein the action of selecting comprises taking into account at least one of a service level agreement (SLA) constraint, network utilization, resource efficiency, quality of service (QoS), transmission delay, bit error rate (BER), physical layer impairment (PLI) effects, a cost function, a latency, a number of hops, load balancing and an optimization criterion.

6. A method of establishing a connection according to claim 1, wherein the action of selecting comprises performing routing and spectrum assignment (RSA).

7. A method of establishing a connection according to claim 6, wherein the action of performing RSA comprises at least one of fixed routing, alternative routing, shortest-path (SP) and k shortest-path (k-SP) and A-star routing.

8. A method of establishing a connection according to claim 6, wherein the action of performing RSA comprises taking into account at least one of signal to noise ratio (SNR), optical SNR (OSNR) and Q-factor.

9. A method of establishing a connection according to claim 6, wherein the action of performing RSA comprises complying with a path computation element (PCE) request and response Protocol (PCEP).

10. A method of establishing a connection according to claim 1, wherein the action of selecting comprises obtaining a physical layer impairment (PLI) effect estimate.

11. A method of establishing a connection according to claim 10, wherein the PLI effect estimate is generated by at least one of a network controller for performing a path computation element (PCE) function, a network controller associated with the physical element and the physical element.

12. A method of establishing a connection according to claim 1, further comprising an action of establishing the selected connection using the physical element associated with the selected connection.

13. A method of establishing a connection according to claim 12, wherein the action of establishing comprises at least one of network provisioning and performing physical adjustments to the physical element to turn up the wavelength channel associated with the selected connection.

14. A network controller in a control plane of a communications network for selecting a connection for a wavelength channel from a plurality of connection candidates, comprising:
a modeling module for obtaining information from a physical element in the network for determining an estimated time for the physical element to establish each connection candidate therethrough for the wavelength channel; and
a routing engine for selecting the connection taking into account the estimated time associated with each connection candidate.

15. A network controller according to claim 14, wherein the network controller is at least one of a path computation element (PCE) server, a central provisioning network management system (NMS) server, at least one of a plurality of distributed routers, a transport software-defined networking (T-SDN) controller and a network orchestration layer.

16. A network controller according to claim 14, wherein the network controller comprises a path computation element (PCE) function on a server.

17. A network controller according to claim 14, wherein the wavelength channel comprises at least one of a wavelength division multiplexing (WDM) channel, a coarse WDM (CWDM) channel, a dense WDM (DWDM) channel, a fixed-grid channel and a flex-grid channel.

18. A network controller according to claim 14, wherein the physical element comprises at least one of a reconfigurable optical add-drop multiplexer (ROADM), a variable optical attenuator (VOA), an optical amplifier, a wavelength specific switch (WSS), a fiber and a transponder.

19. A network controller according to claim 14, wherein the information relates to at least one of a reconfigurable optical add-drop multiplexer (ROADM), a variable optical attenuator (VOA) coupled to the ROADM, an optical amplifier coupled to the ROADM, a wavelength-specific switch (WSS) coupled to the ROADM and a fiber coupled to the ROADM and a transponder coupled to the ROADM.

20. A network controller according to claim 14, wherein the information comprises at least one of an estimated turn-up time, an adjustment time, a resting time, a stabilization time, a provisioning time, a tuning time, a message time, a control or handling time, a latency, an offset associated with the wavelength channel associated with the connection candidate, a margin divided by the offset, a customized function, an ability to open the connection candidate in parallel and a figure of merit (FOM).

21. A network controller according to claim 14, wherein the information incorporates photonic layer processing comprising at least one of provisioning, messaging and delays for establishing a topology, adjustments to the physical element, performance-related issues, communications between elements and dynamic behaviour of the physical element.

22. A network controller according to claim 14, wherein the modeling module determines the estimated time.

23. A network controller according to claim 14, wherein the modeling module is coupled to the physical element.

24. A network controller according to claim 23, wherein the modeling module is coupled through a domain controller.

25. A network controller according to claim 24, wherein the domain controller obtains the information from the physical element and determines the estimated time.

26. A network controller according to claim 24, wherein the domain controller obtains the information from the physical element and forwards it to the modeling module.

27. A network controller according to claim 14, wherein the routing engine performs routing and spectrum assignment (RSA).

28. A network controller according to claim 14, further comprising a physical layer impairment (PLI) evaluator for providing an estimate to the routing engine for the connection candidates to compensate for PLI effects.

29. A path computation element (PCE) server in a control plane, having a processing unit and a non-transitory memory containing computer-readable program instructions for selecting a connection for a wavelength channel from a plurality of connection candidates in a communications network, that, when executed by the processing unit, cause the server to perform actions of:
obtaining information from a physical element in the network, related to an estimated time for the element to establish each connection candidate therethrough for the wavelength channel; and
selecting the connection taking into account the estimated time associated with each connection candidate.

* * * * *

UNITED STATES PATENT AND TRADEMARK OFFICE
CERTIFICATE OF CORRECTION

PATENT NO. : 9,967,052 B2
APPLICATION NO. : 15/248890
DATED : May 8, 2018
INVENTOR(S) : Mohammad Mehdi Mansouri Rad et al.

Page 1 of 1

It is certified that error appears in the above-identified patent and that said Letters Patent is hereby corrected as shown below:

In the Description:

Column 10, Line 15, "Table" should read --Table I--

Signed and Sealed this
Fourteenth Day of August, 2018

Andrei Iancu
*Director of the United States Patent and Trademark Office*